Oct. 16, 1934.   L. C. IRWIN   1,976,730
THERMOSTATIC STEAM TRAP
Filed May 27, 1931
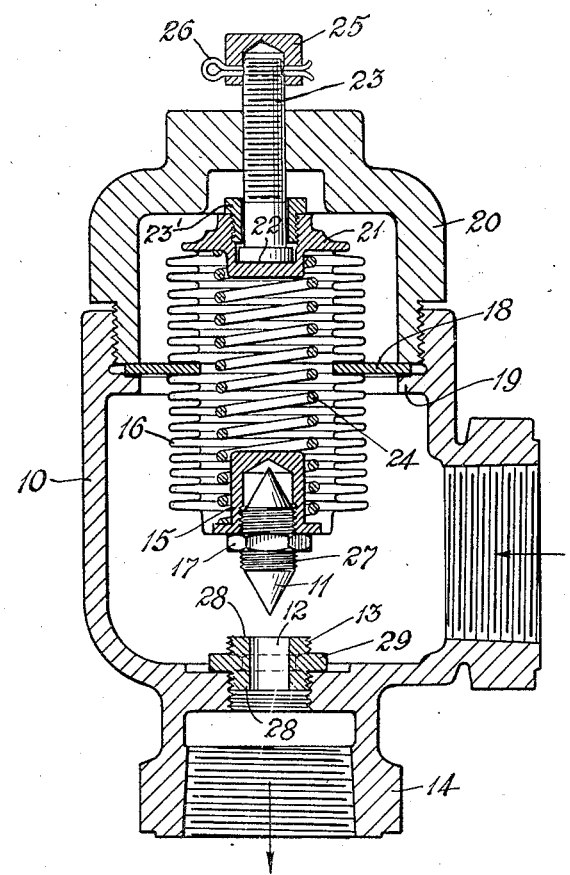
WITNESS
G. V. Rasmussen
BY
INVENTOR
LAWRENCE C. IRWIN
ATTORNEYS Patented Oct. 16, 1934

1,976,730

UNITED STATES PATENT OFFICE 1,976,730

THERMOSTATIC STEAM TRAP

Lawrence C. Irwin, Brooklyn, N. Y., assignor to Charles J. Tagliabue Mfg. Co., Brooklyn, N. Y., a corporation of New York Application May 27, 1931, Serial No. 540,329

15 Claims. (Cl. 236—56)

The present invention relates to control devices commonly known as condensate or steam traps for causing discharge of condensed vapor in a vapor line, such as a steam pipe, steam radiator, or similar apparatus.

Thermostatic steam traps are known which "blow off", i. e. discharge the condensed steam, when the temperature of the condensate falls to a definite temperature. In such known apparatus, once the specific form or nature of the thermostatic element has been selected and the parts of the device suitably mounted, the discharge of the condensate will occur at a fixed, invariable temperature.

It is, however, desirable in many situations to adjust the condensate blow-off temperature to different values at different times. This has heretofore been accomplished by substituting for the thermostatic member in the steam trap a different thermostatic member which will effect discharge of the condensate at the desired different temperature. For example, where the thermostatic element comprised an expansible member filled with a volatile liquid, it has heretofore been necessary, in order to effect discharge at a different temperature, to replace such expansible member with one having a different fluid, a procedure that was both expensive and troublesome.

It is an object of the present invention to provide a thermostatic condensate or steam trap which can be adjusted to any desired temperature within a wide range of temperatures in a simple and economical manner. It is also an object of the invention to provide an adjustable steam trap of the type indicated which is simple in construction and reliable in operation and can be constructed without particular difficulty so as to be highly sensitive to changes in the temperature of the condensate; so much so, that it may be rendered operative to discharge the condensate when the latter falls to a temperature which is below the vapor or steam temperature by as little as 1°. A further object of the invention is to provide an adjustable steam trap wherein the adjusting means is operable from the exterior of the trap and wherein the region of the housing penetrated by the adjusting means is effectively sealed in a simple manner against access of steam or other vapor, so that the necessity for a stuffing box about the adjusting means is eliminated. It is a further object of the invention to provide an adjustable condensate trap which can be used with different apparatus requiring different temperature differentials between vapor and condensate. Other objects of the invention will be apparent from the following description and the features of novelty will be set forth in the appended claims.

On the accompanying drawing is shown by way of example a central vertical section through a steam trap illustrating a preferred embodiment of the present invention.

The steam trap comprises a housing which may be composed of a pipe section 10 forming part of or extending laterally from a steam line, radiator, or similar apparatus. The condensate collects within the housing 10 and is periodically discharged in the manner described hereinbelow by the valve 11 through a discharge port 12 in a threaded valve seat element 13 which is received in a suitably threaded opening in the bottom wall of the housing 10. From the port 12 the discharged condensate passes through a connection 14 to a line leading to the boiler, drain or other suitable place.

The valve 11 is preferably cone-shaped, as illustrated, and is screw-threaded into a socket member 15 attached to and forming part of the bottom of a hollow metallic bellows 16, the valve being held in place by a nut 17. The bellows is connected, as by soldering, welding, etc., intermediate its ends, and preferably above its center, to an annular supporting and sealing member, such as a ring 18, which is clamped to a flange 19 extending inwardly of the housing 10, by a cap 20 which is threaded onto such pipe section. The member 18 may be soldered, welded, or otherwise connected to the blank bellows tube intermediate the ends of the latter, and the tube then shaped in known manner to impart to it the resilient bellows wall construction.

The bellows 16 is completely closed by the socket member 15 and by a head 21 and is filled with a suitable expansible fluid, such as a volatile liquid, which is exposed to the temperature of the condensate and expands and contracts in response to changes in the temperature of the latter. The head 21 loosely receives the enlarged bottom portion 22 of a screw-threaded member 23 passing through a threaded opening in the top wall of the cap 20 and retained in such head by a bushing 23'. Within the interior of the bellows 16 is a spring 24 whose ends bear against the top and bottom walls, respectively, of the bellows, the spring surrounding and being held in place by inwardly projecting portions of such walls, as illustrated.

The operation of the above described device is as follows: Assuming that the steam in a steam line is under a pressure of 5 lbs. gauge, which is equivalent to 227° F., and that it is desired to blow off the condensate when the temperature thereof reaches, say, 190° F., corresponding to a minus pressure of 5 lbs., in the bellows when water (f. i. distilled water introduced under 29.8 in. vacuum until the bellows is half filled) is the volatile liquid employed, the spring 24 is compressed by suitable rotation of the screw 23 to a degree such that when the liquid contained within the bellows is cooled to 190° F. and its pressure consequently reduced, the pressure of the steam in the steam line will be sufficient to overcome the spring and vapor pressure within the bellows and contract the latter sufficiently to open the valve 11. The condensate is then blown out by the pressure steam in the steam line until, upon the arrival of the steam within the space surrounding the portion of the bellows below the supporting ring 18, the temperature of the volatile liquid within the bellows is raised sufficiently to expand the lower portion of the bellows and cause the valve 11 to close. By suitably adjusting the screw 23 the condensate temperature at which the valve will be opened can be easily regulated. The screw 23 may be provided with a polygonal nut or cap 25 held in place by a cotter pin 26 to facilitate rotation of the screw. Any suitable pointer and dial mechanism may, if desired, be associated with the screw 23, to indicate the adjustment of the condensate blow off temperature. No special sealing means, such as a stuffing box, need be provided for the adjusting means 23 as the region of the housing penetrated by the adjusting means is effectively sealed against access of steam from the steam line by the member 18 and the upper portion of the bellows.

It will be noted that the bellows 16 is positioned on the high pressure side of the valve port 12. The bellows is thus directly contacted by the condensate and is sensitive to very small temperature changes in the latter.

It will be observed that the expansion and contraction of the bellows in response to temperature changes are confined to the portion thereof below the supporting and sealing ring 18. The valve 11 and the seat member 13 may be made of any suitable resistant metal or alloy, such as Monel metal. In order to lengthen the life of the device, I prefer to make the valve and valve seat reversible; in the embodiment illustrated, the valve stem is cone shaped at both its ends, while the threaded member 13 has two similar seats 28 at its opposite ends. When one of the valves 11 and its cooperating valve seat 28 become worn, the stem 27 and member 13 may be reversed and a new valve and seat brought into operation. As illustrated, the valve head not in use is received within the socket 15 which extends inwardly of the bellows, so that the length of the device is not increased by the provision of the double-headed valve stem. The member 13 may be provided with a central, polygonal flange 29 for engagement by a wrench, such flange acting also as a stop or gauge to determine the position of the valve seat.

It will be noted that the ring 18 serves both as a sealing member and as a supporting member. If it were so constructed as to serve only in the latter capacity, for instance, if it were perforated, the bellows would still be supported intermediate its ends but steam could pass to the space surrounding the upper portion of the bellows; in that event, it would be advisable to provide packing around the screw 23 to insure against escape of steam from the top of the housing.

Attention is called to the fact that the screw 23 may be rotated or, in other words, the pressure upon the bellows and the spring may be increased or reduced without rotating the bellows, thus permitting the adjustments to be made without compelling a rotation of the bellows and therefore permitting the use of the supporting member 18.

It is obvious that if this ring 18 were omitted altogether, some of the advantages of my invention would be preserved but the value of the device would be greatly diminished.

I claim:

1. A condensate trap comprising a housing having an inlet for connection with the vapor line of a vapor system, said housing adapted to receive an accumulation of condensate which is cooled by the external atmosphere and having a discharge valve, an expansible bellows supporting said valve, means connected with said bellows for supporting the same within said housing, said bellows being operative to open the valve when the temperature of the condensate has fallen to a predetermined value, a spring effective to exert pressure upon said valve, and an adjustable screw associated with said housing and separate from said bellows and operable to vary the pressure of said spring.

2. A condensate trap comprising a housing having an inlet for connection with a source of vapor under elevated temperature and pressure, a discharge valve in said housing, thermostatic bellows associated with said valve and operative to open the same when the temperature of the condensate has reached a predetermined value, said valve being shaped as a valve head at both its ends and being reversible to bring the other valve head into operative position when one of them has become worn, and a socket member carried by the bellows and extending inwardly thereof and adapted to support said valve and house the valve head which is not in use, said socket member telescoping into said bellows, so that only a portion of the length of the double valve extends below the bottom of the bellows.

3. A condensate trap comprising a housing having an inlet for connection with a source of vapor under elevated temperature and pressure, a discharge valve, a bellows supporting said valve and mounted within said housing, a spring positioned within said bellows and bearing against the end walls thereof, an adjustable screw associated with the housing and engaging an end wall of said bellows and operable from the exterior of the housing to vary the pressure of said spring, and a sealing member fixed to the housing and to said bellows at an intermediate portion of the latter, whereby the space surrounding the lower portion of said bellows is sealed from the space surrounding the upper portion of said bellows.

4. A condensate trap comprising a housing having an inlet for connection with a source of vapor under elevated temperature and pressure, a discharge valve, a bellows in said housing associated with said valve to open the same when the temperature of the condensate has reached a predetermined value, mechanism for adjusting said bellows, and a sealing member fixed to the housing and to said bellows at an intermediate portion of the latter, whereby the space surrounding the lower portion of said bellows is sealed from the space surrounding the upper portion of said bellows.

5. A condensate trap comprising a housing having an inlet for connection with a source of vapor under elevated temperature and pressure, a discharge valve, a bellows supporting said valve and mounted within said housing, a spring effective to exert pressure upon said valve, an adjustable screw associated with said housing and operable to vary the pressure of said spring, and a sealing member fixed to the housing and to said bellows at an intermediate portion of the latter, whereby the space surrounding the lower portion of said bellows is sealed from the space surrounding the upper portion of said bellows.

6. A condensate trap comprising a housing having an inlet for connection with a source of vapor under elevated temperature and pressure, a discharge valve, a bellows mounted within said housing, a spring positioned within said bellows and bearing against the end walls of the latter, said valve being supported by one end wall of the bellows, an adjusting device seated within the other wall of the bellows and extending to the outside of the housing to be operated from the exterior thereof, and a sealing member fixed to the housing and to said bellows at an intermediate portion of the latter, whereby the space surrounding the lower portion of said bellows is sealed from the space surrounding the upper portion of said bellows.

7. A condensate trap comprising a housing having an inlet for connection with the vapor line of a vapor system, said housing adapted to receive an accumulation of condensate which is cooled by the external atmosphere, a discharge valve, thermostatic bellows containing an expansible fluid and positioned in said housing and associated with said valve to open the same when the temperature of the condensate has fallen to a predetermined value, a supporting member for said bellows engaging the bellows at an intermediate portion of the latter and fixed to the housing, and means for varying at will the tension in the walls of said bellows comprising a spring acting on said bellows and a rotatable member bearing on the bellows, but detached therefrom, so as to make possible adjustment of the bellows without rotation thereof.

8. A condensate trap as set forth in claim 7 in which the spring is positioned within and bears against the end walls of the bellows.

9. A condensate trap comprising a housing having an inlet for connection with the vapor line of a vapor system, said housing adapted to receive an accumulation of condensate which is cooled by the external atmosphere, a discharge valve, a thermostatic element positioned in said housing and associated with said valve to open the same when the temperature of the condensate has fallen to a predetermined value, means for controllably adjusting the thermostatic element to predetermine the temperature at which the valve is opened, said means penetrating the housing and being operable from outside the housing, and a seal for sealing the region of the housing penetrated by the adjusting means against access of vapor from the vapor system, and engaging said thermostatic element at an intermediate portion of the latter, so that one section of said element is positioned in the same compartment as said valve and the other section is positioned in the compartment penetrated by said adjusting means.

10. A condensate trap as set forth in claim 9 including a spring associated with the thermostatic element to determine the valve operating action thereof, said adjusting means being arranged to affect the tension of said spring upon operation of such means and being detached from said thermostatic element so as to make possible adjustment of the latter without rotation thereof.

11. A condensate trap comprising a housing having an inlet for connection with a source of vapor under elevated temperature and pressure, a discharge valve, a thermostatic bellows engaging said valve and mounted within said housing, a spring effective to exert pressure upon said valve, a sealing member fixed to the housing and to said bellows at an intermediate portion of the latter to seal the space surrounding one portion of said bellows from the space surrounding the other portion of such bellows, and means operable to vary the pressure of said spring and positioned at the side of the sealing member which is inaccessible to the vapor from said source of vapor.

12. A condensate trap comprising a housing having an inlet for connection with a source of vapor under elevated temperature and pressure, a discharge valve, a thermostatic bellows positioned within the housing, adjusting mechanism for said bellows operable to predetermine the temperature to which said valve is opened, an annular member attached to said bellows at an intermediate portion of the latter and fixed to the housing so as to seal the whole of said adjusting mechanism against access by said vapor, and a spring positioned within said bellows and acting upon the end walls of the latter.

13. A condensate trap comprising a housing having an inlet for connection with the vapor line of a vapor system and a discharge opening for the drainage of accumulated condensate in the housing, a valve seat about said opening, a valve controlling said opening, an expansible thermostatic bellows containing an expansible fluid and positioned in said housing at the high pressure side of the valve and associated with such valve to cause the latter to become closed by the heating effect of the vaporous medium upon the expansible bellows and to remain closed until the cooling effect upon the bellows of an accumulation of condensate which has been cooled by the external atmosphere resulting in the contraction of the fluid in the bellows causes the valve to open and the condensate to drain off, a spring effective to exert a force upon the valve in the direction of the closing position of the valve, a manually adjustable member connected with the end of the bellows opposite to the valve end thereof and passing through the housing wall so as to be operable from the exterior of the housing for causing variations in the relative distances between the valve and its seat, and means for sealing the space occupied by the portion of the bellows associated with the valve from the space at that part of the housing which is penetrated by the adjustable member.

14. A condensate trap comprising a housing having an inlet for connection with the vapor line of a vapor system, said housing adapted to receive an accumulation of condensate which is cooled by the external atmosphere, a discharge valve, a thermostatic bellows containing an expansible fluid and positioned in said housing at the high pressure side of the valve, said bellows associated with said valve to cause the latter to open when the temperature of the condensate has fallen to a predetermined value, adjusting means acting upon the bellows for effecting variation in the degree of cooling required by the bellows to effect opening of the valve, said means penetrating the housing and being operable from outside the housing, and a member connected with said bellows and cooperating with a portion of such bellows to provide a seal which seals the portion of the housing containing the valve and the vapor inlet from the portion of the housing immediately surrounding the place at which the adjusting means penetrates the housing, whereby such place of penetration is protected against access of the vapor which surrounds the effective portion of the bellows.

15. A condensate trap as set forth in claim 13, wherein said spring is positioned within the bellows and bears against the end walls of the latter.

LAWRENCE C. IRWIN.